(12) United States Patent
Lange et al.

(10) Patent No.: US 12,316,119 B2
(45) Date of Patent: May 27, 2025

(54) FILTER APPARATUS WITH RECONFIGURABLE CHOKE UNIT CHANGEOVER SWITCH AND CAPACITOR UNIT FOR DIFFERENT AC VOLTAGE NETWORKS

(71) Applicant: Siemens Aktiengesellschaft, Munich (DE)

(72) Inventors: Robert Lange, Crimmitschau (DE); Marco Seja

(73) Assignee: Siemens Aktiengesellschaft, Munich (DE)

( * ) Notice: Subject to any disclaimer, the term of this patent is extended or adjusted under 35 U.S.C. 154(b) by 171 days.

(21) Appl. No.: 18/003,624

(22) PCT Filed: Jun. 18, 2021

(86) PCT No.: PCT/EP2021/066608
§ 371 (c)(1),
(2) Date: Dec. 28, 2022

(87) PCT Pub. No.: WO2022/002640
PCT Pub. Date: Jan. 6, 2022

(65) Prior Publication Data
US 2023/0261470 A1    Aug. 17, 2023

(30) Foreign Application Priority Data
Jun. 29, 2020 (EP) .................................. 20182913

(51) Int. Cl.
*H02J 3/26* (2006.01)
*H02M 1/12* (2006.01)
*H02M 5/458* (2006.01)

(52) U.S. Cl.
CPC ............... *H02J 3/26* (2013.01); *H02M 1/123* (2021.05); *H02M 1/126* (2013.01); *H02M 5/458* (2013.01)

(58) Field of Classification Search
CPC ...... H02J 3/26; H02M 1/10; H02M 1/12–126; H02M 1/32–327; H02M 1/40; H02M 1/42–4291
See application file for complete search history.

(56) References Cited

U.S. PATENT DOCUMENTS 9,859,867 B2 *   1/2018   Westmoreland ..... H03H 7/0115
2007/0296374 A1  12/2007  Baudesson et al.
(Continued)

FOREIGN PATENT DOCUMENTS

EP          2048771 A1    4/2009
WO   WO 2017127856 A1    8/2017

OTHER PUBLICATIONS

English machine translation of WO2017/127856A1 published Aug. 3, 2017 (Year: 2017).*

(Continued)

*Primary Examiner* — Rexford N Barnie
*Assistant Examiner* — David A Shiao
(74) *Attorney, Agent, or Firm* — Henry M. Felereisen LLC (57) ABSTRACT

A filter apparatus for use in a converter in an alternating voltage supply system includes a choke unit, a capacitor unit and saturation reducing unit for the choke unit. A converter having the filter apparatus and to a method for operating the filter apparatus are also disclosed.

8 Claims, 4 Drawing Sheets

(56) References Cited

U.S. PATENT DOCUMENTS

| | | | | |
|---|---|---|---|---|
| 2012/0187894 A1* | 7/2012 | Higuchi | ............... | H02P 27/08 |
| | | | | 318/811 |
| 2019/0165692 A1* | 5/2019 | Armschat | ............... | H02M 1/12 |
| 2021/0288575 A1* | 9/2021 | Liu | ............... | H02M 1/4233 |
| 2021/0384815 A1* | 12/2021 | Kolar | ............... | H02M 1/14 |
| 2023/0179176 A1* | 6/2023 | Fujita | ............... | H02M 1/123 |
| | | | | 327/552 |

OTHER PUBLICATIONS

PCT International Preliminary Report on Patentability mailed Oct. 18, 2022 corresponding to PCT International Application No. PCT/EP2021/066608 filed Jun, 18, 2021.

* cited by examiner

FILTER APPARATUS WITH RECONFIGURABLE CHOKE UNIT CHANGEOVER SWITCH AND CAPACITOR UNIT FOR DIFFERENT AC VOLTAGE NETWORKS

CROSS-REFERENCES TO RELATED APPLICATIONS

This application is the U.S. National Stage of International Application No. PCT/EP2021/066608, filed Jun. 18, 2021, which designated the United States and has been published as International Publication No. WO 2022/002640 A1 and which claims the priority of European Patent Application, Serial No. 20182913.2, filed Jun. 29, 2020, pursuant to 35 U.S.C. 119 (a)-(d).

BACKGROUND OF THE INVENTION

The invention relates to a filter apparatus for use in a converter on an AC voltage network, having a choke unit and a capacitor unit.

In operation for example, electrical devices in the field of drive and automation technology, but also power supply, can generate cable-bound and/or field-bound electrical interference. In order to reduce such interference emission, common-mode chokes are usually used in connections with capacitor units for corresponding filters in order to reduce or avoid common-mode currents.

Common-mode currents refer to currents in the individual phases of an electric cable which, in contrast to differential-mode currents, each have the same sign with regard to their current direction.

The differential-mode currents, on the other hand, add up to zero with regard to their current direction, in particular in an interference-free case, in the sum of their current i.e. the total amount of current flowing to a consumer in the phases of an electric cable is equal to the amount of current flowing back from the consumer in the phases. This also applies in particular when a neutral conductor is used. The resulting interference variables are also referred to as symmetrical interference or differential-mode interference.

As common-mode currents to the consumer have the same current direction, their reverse current takes its path via electrostatic capacitances, in particular via cable capacitances, via grounded components of the electrical devices or via the surrounding ground to the power generator.

Interference variables resulting from the differential-mode currents are also referred to as asymmetrical interference or common-mode interference.

Common-mode interference is caused, for example, by spark interference in brush motors, by switched-mode power supplies and frequency converters for electric machines, it also being possible for significant electrical losses or loads to occur in electrical devices, in electrical cables connected to them and, ultimately, in energy distribution systems (networks, transformers) and energy generators (generators).

For a common-mode filter, current-compensated chokes with a choke core are frequently used as a common-mode choke, the windings wound around the common choke core per phase, for example, having the same number of turns.

Furthermore, the common-mode filter has, as a capacitor unit, so-called interconnected capacitors in a Y-configuration (Y-capacitor unit), which are connected to a ground potential by means of a protective conductor (PE).

This common-mode filter with a usually very low-resistance connection of the Y-capacitor unit via the protective conductor to the ground potential is particularly suitable for dissipating the common-mode current (the interference variable) during the operation of electrical devices, for example converters, on a TT network (TT being the French acronym Terre Terre, i.e. ground-ground) or TN network (TN being the French acronym Terre Neutre, i.e. ground-neutral) with a network star point grounded at ground potential on the generator side of the network.

These networks have at least one of the following designs or connections of the network star point grounded at ground potential, according to which the protective conductor of the electrical cable alone, the protective conductor by means of an at least partial combination of neutral conductor (N) and protective conductor, or the neutral conductor of the electrical cable alone, is connected to the grounded network star point on the generator side of the corresponding network (the power source).

However, the Y-capacitor unit of a common-mode filter with a common-mode choke for electrical devices such as, for example converters, which is connected to the ground potential via the protective conductor, cannot be operated on an IT network (IT being the French acronym Isolé Terre, i.e. isolated-ground) monitored in particular for electrical interference, which is designed to be ground-free with regard to its phases, in particular on the generator side (the power source), in other words, insulated from the ground potential. Here, in interference-free operation, only very low leakage currents or none at all are permissible, in particular via the Y-capacitor unit and the protective conductor to the ground potential.

If operation of electrical devices such as, for example converters, is employed on a TT network or a TN network in which, in contrast to a grounded network star point, an external conductor, that is to say a phase of the TT or TN network on the generator side (the power source), is thus connected to the grounded ground potential, then here too, for specific operating states, only very low leakage currents or none at all are admissible, in particular via the Y-capacitor unit and the protective conductor to the ground potential.

Hitherto, it has therefore usually been customary, as a precaution, to operate such electrical devices by means of an upstream isolating transformer on ground-free IT networks or TN and TT networks with a grounded external conductor, the isolating transformer having to have a grounded network star point on the secondary side and being very cost-intensive and requiring a large amount of installation space.

Furthermore, it is possible to remove the Y-capacitor unit on the corresponding electrical device or to disconnect the connection to the grounded protective conductor and thus to the ground potential. However, this is generally only possible if no current-compensated choke is used in the filter on the electrical device.

Although the separation of the Y-capacitor unit from the grounded protective conductor leads, on the one hand, to the prevention or at least to the reduction of the leakage currents or also to a reduction of the voltage load of the capacitors of the Y-capacitor unit, on the other hand the current-compensated choke can be driven periodically into saturation as the leakage path for the common-mode currents of the common-mode interference is ineffective at this point as a result of the separation of the Y-capacitor unit. This can lead to excessive heating of the choke core of the current-compensated choke and cause destruction of the common-mode choke.

It is also possible, of course, to design the current-compensated choke to be oversized in such a way that it is equipped for all conceivable applications in the event of a separation of the connection between the Y-capacitor unit and the grounded protective conductor, this approach leading in an inefficient manner to high costs and high usage of installation space.

The object underlying the invention is therefore to propose an efficient filter apparatus having a common-mode choke and a capacitor unit which is suitable, on the one hand, for use in a network with a grounded network star point and, on the other hand, for use in a network having a grounded external conductor or a ground-free network, without inadmissibly heating the common-mode choke.

SUMMARY OF THE INVENTION

The object is achieved by a filter apparatus as set forth hereinafter, by a converter as set forth hereinafter and by a method for operating the filter apparatus as set forth hereinafter.

In order to achieve the object, a filter apparatus for use in a converter on an AC voltage network is proposed, having a choke unit, a capacitor unit and means for reducing the saturation of the choke unit.

The means of reducing the saturation of the choke unit advantageously prevents the common-mode choke from being heated inadmissibly, Thus, the filter apparatus with the choke unit can be used as a common-mode choke together with the capacitor unit for use, for example, of the converter on networks with different grounding concepts.

Advantageous embodiments of the filter apparatus are specified in the dependent claims.

In a first advantageous embodiment, the filter apparatus is set up for a first operation of the converter on a network designed as an AC voltage network with a grounded external conductor or on a ground-free network designed as an AC voltage network, it being possible for the means of reducing saturation to be activated and for the capacitor unit to be disconnected from a grounded protective conductor.

The AC voltage network as a network with a grounded external conductor is advantageously understood to mean, in particular, TT networks or TN networks in which only one of the external conductors is connected to the ground potential on the generator side of the respective network, and the ground-free network designed as an AC voltage network is advantageously understood to mean in particular, an IT network in which the electrical phases, in particular on the generator side of the network, are electrically insulated from the ground potential.

For the operation of the filter apparatus on the networks with a grounded external conductor or on the ground-free network, it is advantageously possible to dispense with an isolating transformer.

In this first operation, it is thus advantageous to be able to activate the means for reducing saturation in order to be able to prevent inadmissible heating of the choke unit, which can be operated as a common-mode choke, for as many of its electrical states as possible in the first operation by means of the reduction in saturation. In this first operation, the capacitor unit can be disconnected from the grounded protective conductor, which preferably supports the prevention of inadmissible heating of the common-mode choke.

In a further advantageous embodiment of the filter apparatus, the filter apparatus is set up for a second operation of the converter on a network designed as an AC voltage network with a grounded network star point, it being possible for the capacitor unit to be connected to the grounded protective conductor for the dissipation of current, and it being possible for the means for reducing saturation to be deactivated.

The AC voltage network as a network with a grounded network star point is advantageously understood to mean in particular TT networks or TN networks in which the network star point formed on the generator side of the respective network is connected to the ground potential.

In this second operation, it is thus advantageous to be able to connect the capacitor unit to the grounded protective conductor in order to be able to dissipate the current which can be generated as a common-mode current. The means for reducing saturation can preferably be deactivated in the second operation, which can efficiently support the current dissipation of the common-mode current.

In a further advantageous embodiment of the filter apparatus, the choke unit comprises a first coil in a first AC voltage phase, a second coil in a second AC voltage phase and a third coil in a third AC voltage phase of the first AC voltage cable, the means for reducing saturation has a fourth coil of the choke unit, the choke unit forms a common choke core on the first, second, third and fourth coil and the means for reducing saturation has a first contact unit for opening and closing a first electrical connection of a circuit on the fourth coil.

The inadmissible heating of the common choke core can advantageously be prevented via the fourth coil on the common choke core of the choke unit, which can be operated as a common-mode choke, in particular as a current-compensated choke, and via the circuit on the fourth coil, which is short-circuited by the first contact unit. The common-mode current which can be generated as current in the first operation can be neutralized on the common-mode choke in such a way that the common choke core of the common-mode choke is not driven into saturation in an inadmissible manner, for example periodically. The current dissipation of the common-mode current via the capacitor unit to the grounded protective conductor is not necessary to prevent saturation of the common choke core.

This is advantageously suitable for the use of the filter apparatus on the network designed as an AC voltage network with a grounded external conductor or on the ground-free network designed as an AC voltage network.

In a further advantageous embodiment of the filter apparatus, the capacitor unit comprises a first, second and third capacitor, the first capacitor is electrically connected, on the one hand, to a first AC voltage phase of the first AC voltage cable, the second capacitor is electrically connected, on the other hand, to a second AC voltage phase of the first AC voltage cable, and the third capacitor is electrically connected, on the other hand, to a third AC voltage phase of the first AC voltage cable and the capacitors, on the other hand, form a capacitor star point.

In a further advantageous embodiment of the filter apparatus, a second contact unit is designed for opening and closing a second electrical connection of the capacitor unit to the grounded protective conductor, and the capacitors of the capacitor unit can be electrically connected to the grounded protective conductor via the capacitor star point and the second contact unit.

The common-mode current which can be generated as a current in the second operation can advantageously be dissipated from the capacitor unit via the second contact unit to the grounded protective conductor.

In a further advantageous embodiment of the filter apparatus, at least one of the contact units has an electromechanical connector or a semiconductor switch.

In a simple form, the electromechanical connector can, for example, advantageously be designed as a screw connection, but also as an electric switch.

In a further advantageous embodiment of the filter apparatus, at least one of the contact units is designed as an actuatable switch.

An actuatable switch can be designed, for example, as an IGBT or MOSFET, but also as a relay or contactor.

In a further advantageous embodiment of the filter apparatus, at least one of the contact units can be actuated by means of an actuation signal of a control unit.

The control unit can be comprised by the filter apparatus or, for example, also by a control unit of the converter.

It can likewise be designed as a control unit which is comprised by, for example, a superimposed drive, automation or energy controller. Should the network topology change, the filter apparatus can be switched over in an efficient and advantageous manner, so that the filter apparatus can be used for the first operation or the second operation of the converter.

In a further advantageous embodiment of the filter apparatus, the contact units are designed as an electric changer.

By means of the electrical changer, also known as a changeover switch, the first and second contact units are switched over simultaneously and thus the contact units are switched over simultaneously. For example, in a first switching state of the changer, the first contact unit is closed, and the second contact unit is open. After activation of the changer, the first contact unit is then open and the second contact unit is closed in a second switching state of the changer. This switching process of the simultaneous switching of the two contact units by the electrical changer can be carried out reversibly.

In order to achieve the object, a converter with the filter apparatus according to the invention for operating an electric machine on an AC voltage network is also proposed.

In a first advantageous embodiment of the converter, the filter apparatus is integrated into a converter housing of the converter.

The integration of the filter apparatus into the converter housing of the converter has the advantage, for example, that the converter, in a compact design, always has the filter apparatus for connection to the various network topologies for the first and the second operation of the converter, and a customer can decide on the respective operation by means of adjustment on the converter.

In order to achieve the object, a method for operating the filter apparatus according to the invention is also proposed, the filter apparatus for the first operation of the converter being set on the network designed as an AC voltage network with a grounded external conductor, or on the ground-free network designed as an AC voltage network, or the filter apparatus for the second operation of the converter being set on the network designed as an AC voltage network with a grounded network star point.

In a first advantageous embodiment of the method, the means for reducing the saturation of the choke unit is activated in the first operation of the converter and the capacitor unit is separated from the grounded protective conductor.

In a further advantageous embodiment of the method, in the second operation of the converter, the capacitor unit is connected to the grounded protective conductor for current dissipation and the means for reducing the saturation is deactivated.

BRIEF DESCRIPTION OF THE DRAWING

The properties, features and advantages of this invention described above, as well as the manner in which they are achieved, become clearer and more readily understandable in connection with the following description of the exemplary embodiments, which are explained in more detail in connection with the figures, in which.

DETAILED DESCRIPTION OF PREFERRED EMBODIMENTS

Figure 1:
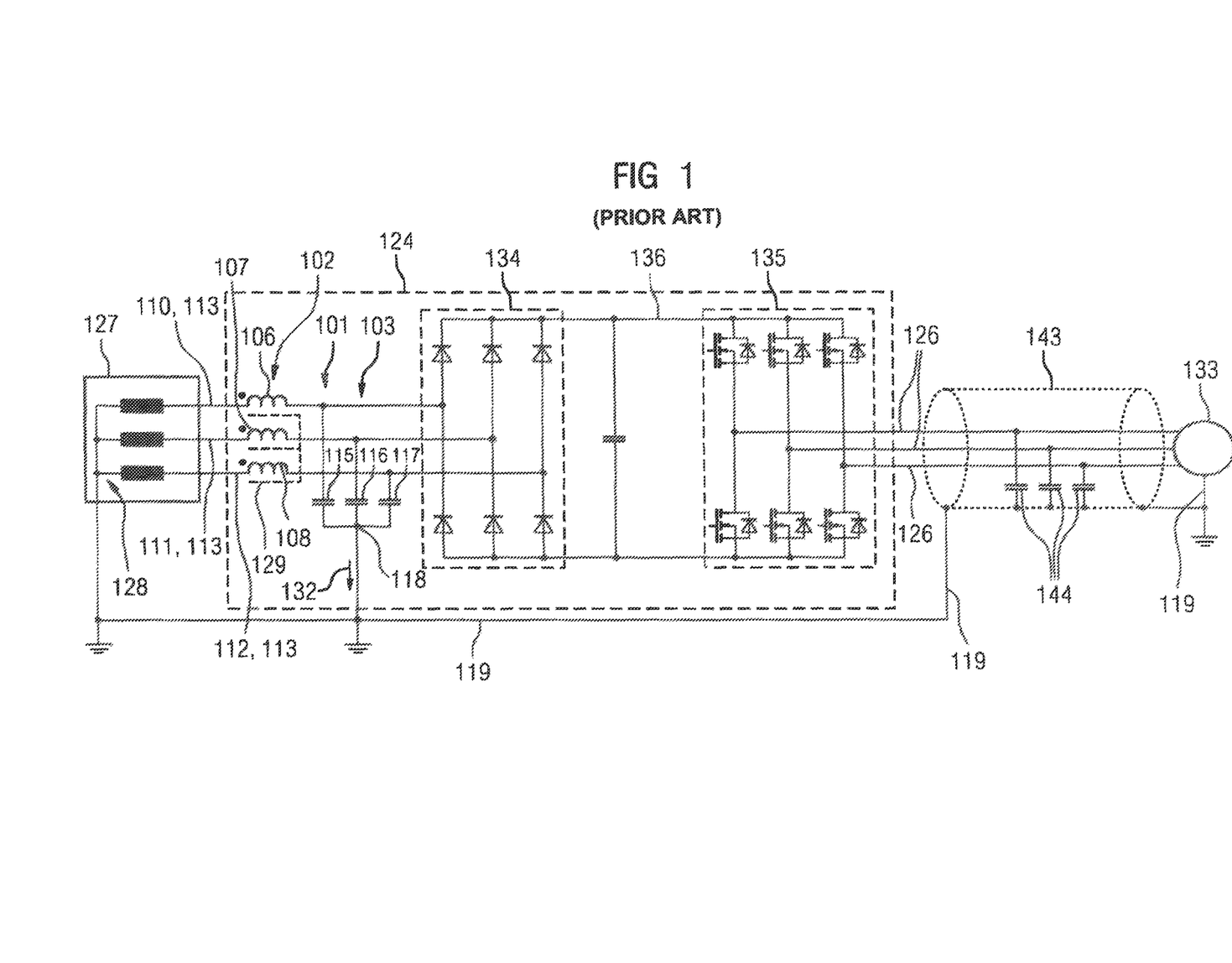
FIG. 1 shows a schematic representation of a known filter apparatus.

FIG. 1 shows a schematic representation of a known filter apparatus 101 which is electrically arranged on a first AC voltage cable 113 and is electrically connected via the first AC voltage cable 113 to a rectifier 134 of a converter 124.

The converter 124 also has an inverter 135 which is electrically coupled to the rectifier 134 by means of a DC voltage intermediate circuit 136.

The converter 124 is coupled on the output side via the inverter 135 and a second AC voltage cable 126 to an electric machine 133, the electric machine 133 being connected to the ground potential via a grounded protective conductor 119.

The second AC voltage cable 126 has a cable shield 143 which is connected to the grounded protective conductor 119 and thus to the ground potential. During operation of the converter 124, cable capacitances 144 are formed, starting from the individual phases of the second AC voltage cable 126 with respect to the cable shield 134.

The filter apparatus 101 has a choke unit 106 in the form of a common-mode choke (current-compensated choke) and a capacitor unit 103 on the first AC voltage cable 113.

The choke unit 102 comprises a first coil 106 in a first AC voltage phase 110, a second coil 107 in a second AC voltage phase 111 and a third coil 108 in a third AC voltage phase 112 of the first AC voltage cable 113. Furthermore, the choke unit 102 forms a common choke core 129 on the first, second and third coils 106,107,108.

The capacitor unit 103 comprises a first, second and third capacitor 115,116,117. The first capacitor 115 is connected, on the one hand, to the first AC voltage phase 110 of the first AC voltage cable 113, the second capacitor 116 is connected on the other hand, to the second AC voltage phase 111 of the first AC voltage cable 113, and the third capacitor 117 is connected, on the other hand, to the third AC voltage phase 112 of the first AC voltage cable 113 and the capacitors 115,116,117, on the other hand form a capacitor star point 118.

The capacitors 115,116,117 of the capacitor unit 103 are connected to to grounded protective conductor 119 via the capacitor star point 118. Thus, a current 132 in the form of a common-mode current can be dissipated with respect to the ground potential.

It is possible that a further capacitor can be connected in the connection between the capacitor star point 118 and the grounded protective conductor 119 (not shown in FIG. 1).

The converter 124 with the filter apparatus 101 is connected on the input side by means of the first AC voltage cable 113 to an AC voltage network 127. The AC voltage network 127 is designed as a network with the grounded star point 128, here as a TN network with a grounded star point 128. The ground potential for the grounded star point 128 is connected to the protective conductor 119.

A dissipation of the current 124 is only possible in the known example insofar as the converter 124 is operated, as in FIG. 1, on the network with a grounded network star point 128 or with an additional isolating transformer (not shown in FIG. 1).

Figure 2:
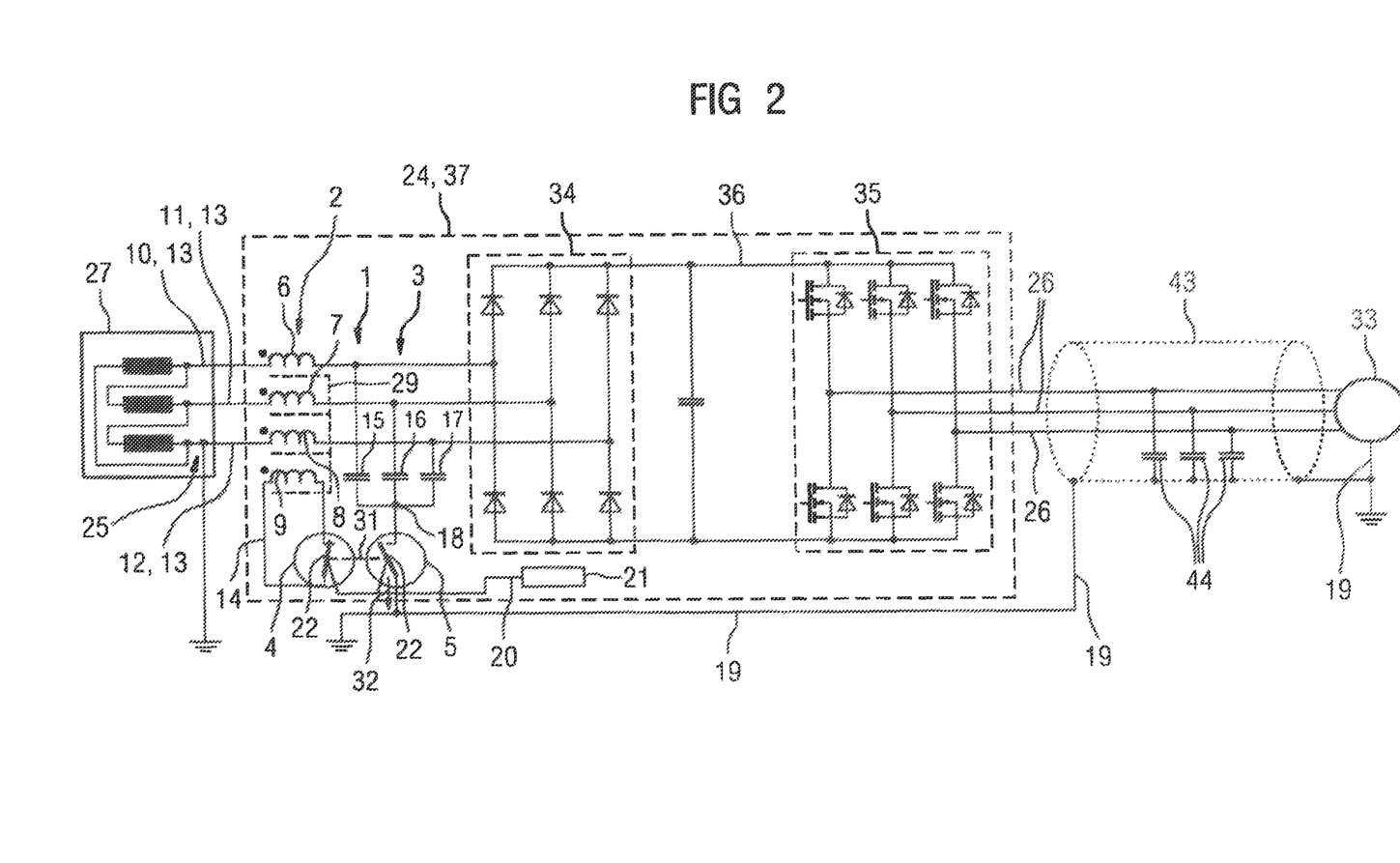
FIG. 2 shows a first schematic representation of the filter apparatus according to the invention.

FIG. 2 shows a first schematic representation of the filter apparatus 1 according to the invention, which is electrically arranged on a first AC voltage cable 13 and is connected via the first AC voltage cable 13 to a rectifier 34 of a converter 24.

The converter 24 also has an inverter 35, which is electrically coupled to the rectifier 34 by means of a DC voltage intermediate circuit 36.

The converter 24 is coupled on the output side via the inverter 35 and a second AC voltage cable 26 to an electric machine 33, the electric machine 33 being connected to the ground potential via a grounded protective conductor 19.

The second AC voltage cable 26 has a cable shield 43 which is connected to the grounded protective conductor 19 and thus to the ground potential. During operation of the converter 24, cable capacitances 44 are formed, starting from the individual phases of the second AC voltage cable 26 with respect to the cable shield 34.

The filter apparatus 1 has a choke unit 6 in the form of a common-mode choke (current-compensated choke) and a capacitor unit 3 on the first AC voltage cable 3.

The choke unit 2 comprises a first coil 6 in a first AC voltage phase 10, a second coil 7 in a second AC voltage phase 11 and a third coil 8 in a third AC voltage phase 12 of the first AC voltage cable 13.

A means for reducing the saturation of the choke unit 2 has a fourth coil 9 of the choke unit 2.

The means for reducing saturation also comprises a first contact unit 4 for opening and closing a first electrical connection of a circuit 14 on the fourth coil 9. The choke unit 2 forms a common choke core 29 on the first, second, third and fourth coils 6,7,8,9. The circuit 14 on the fourth coil is shown in FIG. 2 as short-circuited by the first contact unit 4, the means for reducing saturation being activated.

The capacitor unit 3 comprises a first, second and third capacitor 15,16,17. The first capacitor 15 is connected, on the one hand, to the first AC voltage phase 10 of the first AC voltage cable 13, the second capacitor 16 is connected, on the other hand, to the second AC voltage phase 11 of the first AC voltage cable 13, and the third capacitor 17 is connected, on the one hand, to the third AC voltage phase 12 of the first AC voltage cable 13 and the capacitors 15,16,17, on the other hand, form a capacitor star point 18.

The capacitors 15,16,17 of the capacitor unit 3 are connected to the grounded protective conductor 19 via the capacitor star point 18 and the second electrical contact unit 5, the second contact unit 5 being electrically open. In FIG. 2, a current 32 in the form of a common-mode current for a second operation of the converter 24 is not dissipated with respect to the ground potential.

It is possible that a further capacitor in the connection between the capacitor star point 18 and the grounded protective conductor 19 can be connected in series with the first contact unit 5 (not shown in FIG. 2).

The two contact units 4,5, each with an actuatable switch 22 per contact unit 4,5, can each be actuated alone or together by means of an actuation signal 20 from a control unit 21. In FIG. 2, both contact units 4,5 are designed as an electric changer 8.

The converter 24 with the filter apparatus 1 is connected to an AC voltage network 27 on the input side by means of the first AC voltage cable 13. The AC voltage network 27 is designed as a network with a grounded external conductor 25, here as a TT network with a grounded external conductor 25. The ground potential for the grounded external conductor 25 is not connected to the protective conductor 19.

Accordingly, the schematic representation of the filter apparatus 1 shown in FIG. 2 is provided for a first operation of the converter 24 on the network designed as an AC voltage network 27 with a grounded external conductor 25.

Furthermore, the converter 24 with the filter apparatus 1 can also be operated in this connection on a ground-free network designed as an AC voltage network 27, for example, an IT network. In this case, the AC voltage network 27 is insulated from the ground potential (not shown in FIG. 2).

Figure 3:
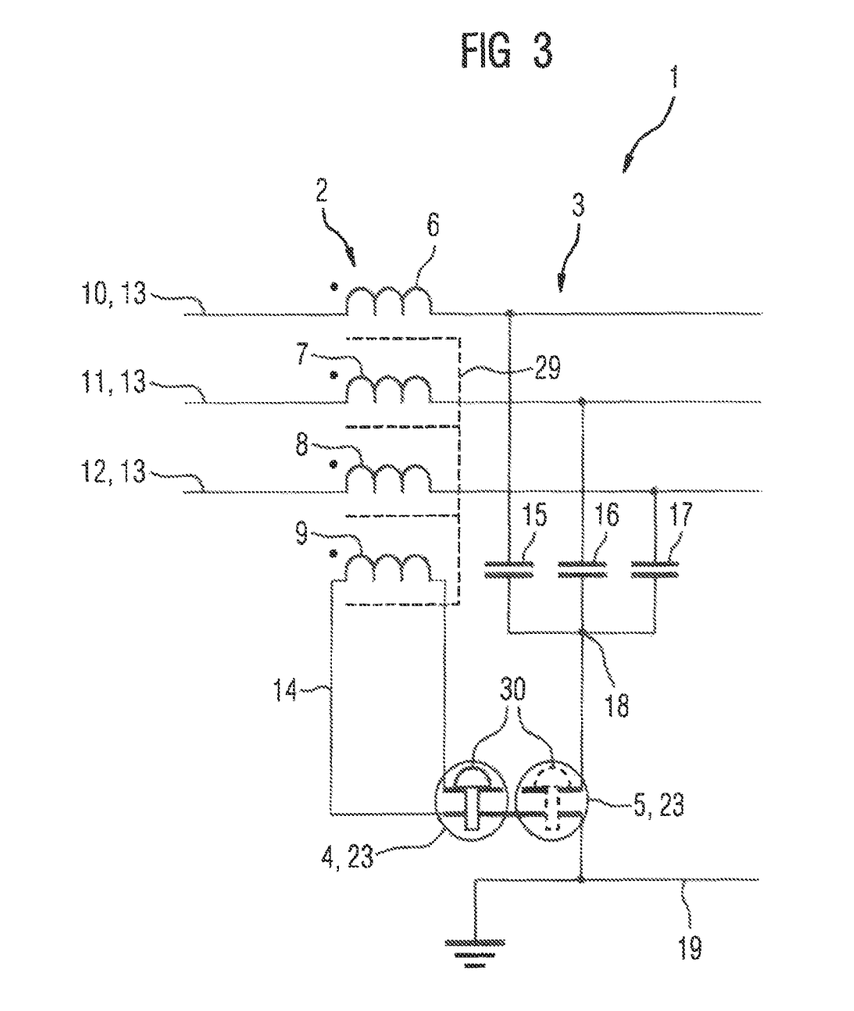
FIG. 3 shows a second schematic representation of the filter apparatus according to the invention in a cut-out according to FIG. 2

FIG. 3 shows a second schematic representation of the filter apparatus 1 according to the invention as a cut-out according to FIG. 2.

The filter apparatus 1 is electrically arranged on the first AC voltage cable 13.

The filter apparatus 1 has the choke unit 6 in the form of a common-mode choke (current-compensated choke) and the capacitor unit 3 on the first AC voltage cable 3.

The choke unit 2 comprises the first coil 6 in the first AC voltage phase 10, the second coil 7 in the second AC voltage phase 11 and the third coil 8 in the third AC voltage phase 12 of the first AC voltage cable 13.

The means for reducing the saturation of the choke unit 2 comprises the fourth coil 9 of the choke unit 2.

The means for reducing saturation also comprises the first contact unit 4 for opening and closing the first electrical connection of the circuit 14 on the fourth coil 9. The choke unit 2 forms the common choke core 29 on the first, second, third and fourth coils 6,7,8,9. The circuit 14 on the fourth coil is shown in FIG. 3 as short-circuited by the first contact unit 4, the means for reducing saturation being activated.

The capacitor unit 3 comprises the first, second and third capacitor 15,16,17. The first capacitor 15 is connected, on the one hand, to the first AC voltage phase 10 of the first AC voltage cable 13, the second capacitor 16 is connected, on the other hand, to the second AC voltage phase 11 of the first AC voltage cable 13 and the third capacitor 17 is connected, on the other hand, to the third AC voltage phase 12 of the first AC voltage cable 13, and the capacitors 15,16,17, on the other hand, form the capacitor star point 18.

The capacitors 15,16,17 of the capacitor unit 3 are connected to the grounded protective conductor 19 via the capacitor star point 18 and the second electrical contact unit 5, the second contact unit 5 being electrically open. A current 32 in the form of a common-mode current for the second operation of the converter is not dissipated with respect to the ground potential in FIG. 3.

The two contact units 4,5 are each designed as electromechanical connectors 23 in the form of screw connections 22 in FIG. 3. The screw connection 22 of the second contact unit 5 is shown in dashed lines, which is intended to show the electromechanical connector 23 as open.

It is possible that a further capacitor can be connected in series with the first contact unit 5 in the connection between the capacitor star point 18 and the grounded protective conductor 19 (not shown in FIG. 3).

Accordingly, the schematic representation of the filter apparatus 1 shown in FIG. 3 in detail according to FIG. 2 is suitable for a first operation of the converter on the network designed as an AC voltage network with a grounded external conductor (not shown in FIG. 3).

Furthermore, the converter with the filter apparatus 1 can also be operated in this connection on a ground-free network designed as an AC voltage network, for example, an IT network. In this case, the AC voltage network is insulated from the ground potential (not shown in FIG. 3).

Figure 4:
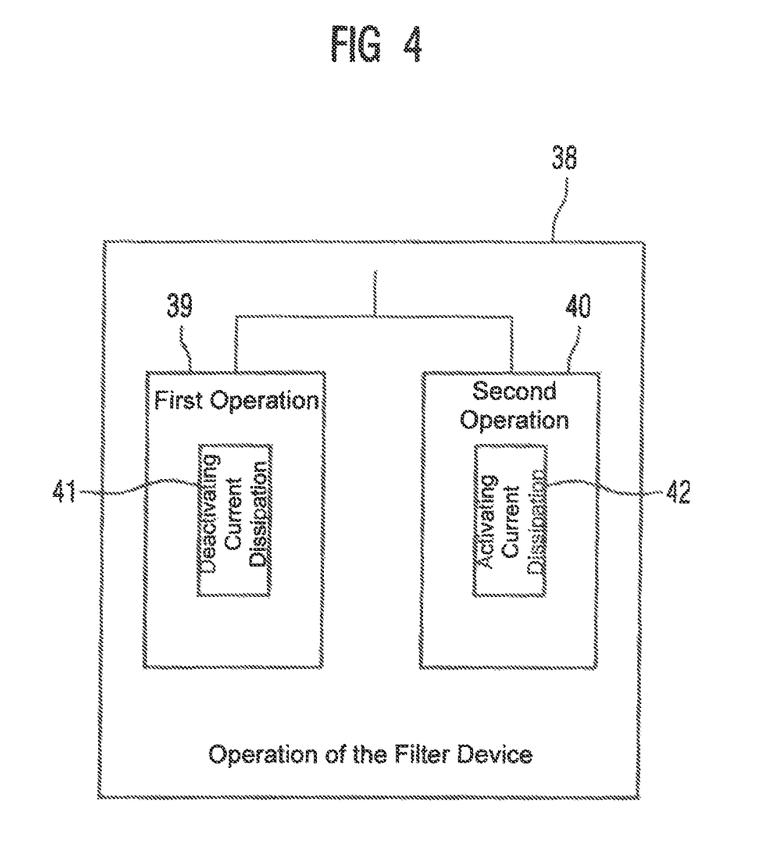
FIG. 4 shows a schematic structure chart of a method for the filter apparatus according to the invention.

FIG. 4 shows a schematic structure chart of a method 38 for the filter apparatus according to the invention.

The method 38 shows the operation of the filter apparatus, according to which the filter apparatus for the first operation 39 of the converter is set for the network designed as an AC voltage network with a grounded external conductor or for the ground-free network designed as an AC voltage network, or the filter apparatus for the second operation 40 of the converter is set for the network designed as an AC voltage network with a grounded network star point.

The user of the filter apparatus on the converter should decide upon one of the two operating modes of the converter, first operation 39 or second operation 40.

In the first operation 39 of the converter, the means for reducing the saturation 41 of the choke unit is activated and the capacitor unit is disconnected from the grounded protective conductor, the current dissipation 41 being deactivated.

In the second operation 40 of the converter, the capacitor unit is connected to the grounded protective conductor, the current dissipation 42 being activated and the means for reducing saturation 41 being deactivated.

What is claimed is:

1. A filter apparatus configured for a first operation of a converter connected via a first AC cable to a three-phase AC voltage network having a grounded external conductor or to a three-phase AC voltage network without a ground connector and for a second operation of the converter on a three-phase AC voltage network with a grounded network star point, the filter apparatus comprising:
    a choke unit comprising a first coil in a first AC voltage phase, a second coil in a second AC voltage phase and a third coil in a third AC voltage phase;
    a changeover switch comprising a first contact unit with an actuatable switch for opening and closing a first electrical connection and a second contact unit with an actuatable switch for opening and closing a second electrical connection, the changeover switch configured to simultaneously and reversibly switch from a first switching state in which the first contact unit is closed and the second contact unit is open to a second switching state in which the first contact unit is open and the second contact unit is closed;
    a capacitor unit connected to the second contact unit and configured to be connected to a grounded protective conductor for current dissipation of a current in the second switching state by the closed second electrical connection and to be disconnected from the grounded protective conductor in the first switching state by the opened second electrical connection; and
    a saturation reducing unit comprising a fourth coil of the choke unit connected to the first contact unit and configured to activate the saturation reducing unit with a short circuit the fourth coil in the first switching state by the closed first electrical connection and to deactivate the saturation reducing unit in the second switching state by the open first electrical connection for reducing saturation of the choke unit when the first electrical connection is closed,
    wherein the first, second, third and fourth coil have a common choke core.

2. The filter apparatus of claim 1, wherein
    the capacitor unit comprises a first capacitor having a first terminal connected to the first AC voltage phase, a second capacitor having a first terminal connected to the second AC voltage phase, and a third capacitor having a first terminal connected to the third AC voltage phase, and
    wherein second terminals of the first, second and third capacitors are connected at a capacitor star point.

3. The filter apparatus of claim 2, wherein the second contact unit is connected between the capacitor star point and the grounded protective conductor.

4. The filter apparatus of claim 1, wherein at least one of the first and second contact units comprises an electromechanical connector or a semiconductor switch.

5. The filter apparatus of claim 1, wherein at least one of the first and second contact units is actuatable by an actuation signal from a control unit.

6. A converter for operating an electric machine on a three-phase AC voltage network, the converter comprising the filter apparatus of claim 1.

7. The converter of claim 6, further comprising a converter housing, wherein the filter apparatus is integrated in the converter housing.

8. A method for operating the filter apparatus as claimed in claim 1, comprising:
    setting the filter apparatus for the first operation of the converter in the three-phase AC voltage network with the grounded external conductor or without the ground connector by switching the changeover switch to the first switching state; or
    setting the filter apparatus for the second operation of the converter in the AC voltage network with the grounded network star point by switching the changeover switch to the second switching state.

* * * * *